Feb. 12, 1952 G. W. EMMERT 2,585,099
QUIZ GAME APPARATUS
Filed May 14, 1947 3 Sheets-Sheet 1

INVENTOR
GEORGE W. EMMERT
BY
*Albert G. McCaleb*
ATTORNEY

Feb. 12, 1952     G. W. EMMERT     2,585,099
QUIZ GAME APPARATUS
Filed May 14, 1947                                   3 Sheets-Sheet 2
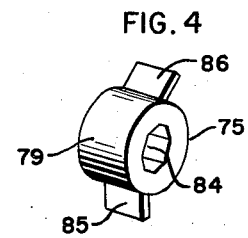
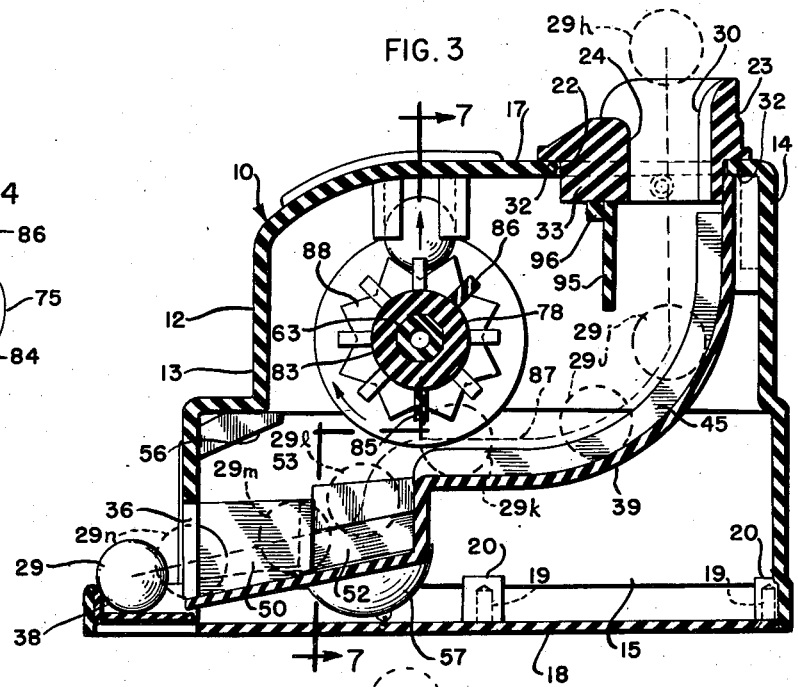
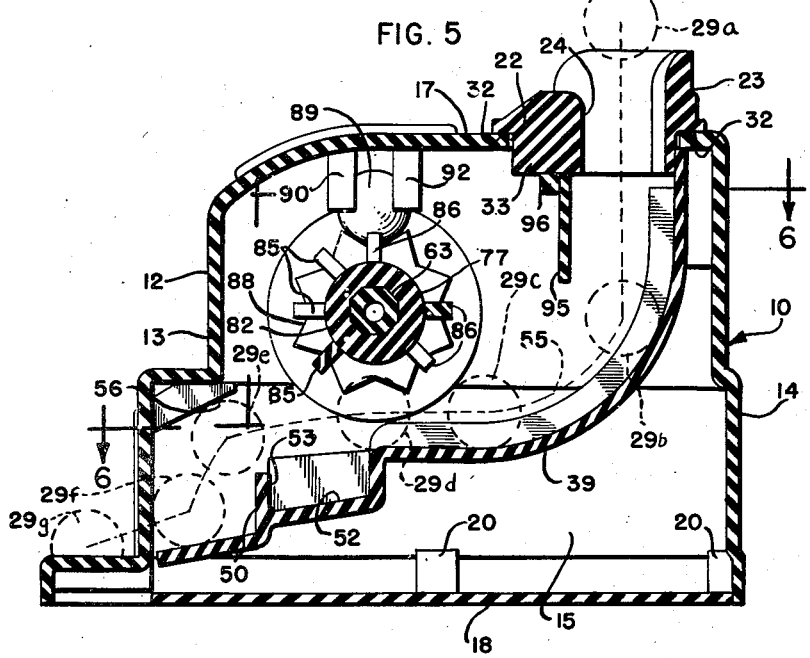
INVENTOR
GEORGE W. EMMERT
BY
*Albert G. McCaleb*
ATTORNEY Feb. 12, 1952 G. W. EMMERT 2,585,099
QUIZ GAME APPARATUS
Filed May 14, 1947 3 Sheets-Sheet 3

INVENTOR
GEORGE W. EMMERT
BY
Albert G. McCaleb
ATTORNEY

Patented Feb. 12, 1952

2,585,099

UNITED STATES PATENT OFFICE 2,585,099

QUIZ GAME APPARATUS

George W. Emmert, Chicago, Ill.

Application May 14, 1947, Serial No. 747,909

5 Claims. (Cl. 35—9)

This invention relates to quiz game apparatus and the like, and more particularly to such apparatus by which a predetermined number of choices are presented for selection, and upon the exercise of such selection the apparatus provides an indication of its accuracy or correctness.

In many respects, my present invention provides apparatus adapted to serve the functions of a quiz answer receiver and accuracy checker, in that it offers a predetermined number of choices for the selection of an answer to each of a prearranged series of questions and answers, and then rules upon the correctness of the answers by giving a positive resultant indication.

One of the objects of my invention is to provide mechanical apparatus adapted to a game of choice, such as a quiz game, which apparatus provides a positive indication of the correctness or accuracy of the choice.

As another object, the invention comprehends the provision of apparatus embodying means for making a selection of any one of a predetermined number of possible choices at any one time, and in which the correct selection for each time effects a change to provide a different correct selection for the next time, whereby the series of correct selections for a succession of times is varied through a predetermined irregular sequence.

Another object of this invention is to provide apparatus having the characteristics set forth in the preceding object and in which the cycles of recurrence of the predetermined irregular sequence of correct selections span a multiple of the number of possible choices at any one time.

My present invention has for a further object the provision of quiz game apparatus for indicating the correctness of answers to prearranged questions and given choices of answers placed in predetermined sequence.

It is another object of the invention to provide in quiz game apparatus a variable part adjustable to a number of predetermined positions suited to various sets of questions so as to change the relationship of question numbers in a sequence to the correct answer selecting positions, thereby minimizing the selection of correct answers by memory of number sequence.

As another object, my invention has within its purview the use of a choice designating element having weight together with apparatus designed and arranged in such a way that movement of the choice designating element therein furnishes the only power necessary for the actuation and operation of the apparatus when selections are made.

Another object of my invention is to provide quiz game apparatus adapted to use with a practically unlimited number of question sets.

It is also within the purview of the invention to provide quiz game apparatus of the type referred to and which is further characterized by inexpensive and durable structure.

Other objects and advantages of the invention will be apparent from the following description and the accompanying drawings in which similar characters of reference indicate similar parts throughout the several views.

In the three sheets of drawings:

Figs. 1 and 2 are, respectively, top plan and side elevational views of quiz game apparatus embodying a preferred form of my invention;

Figs. 3 and 5 are side sectional views of the apparatus wherein the sections are taken substantially on line 3—3 and 5—5 of Fig. 1 and viewed in the directions indicated by the arrows; said views providing illustrations of different phases of operation of the apparatus;

Fig. 4 is a perspective view of a part utilized in the apparatus disclosed in Figs. 3 and 5;

Figure 1:
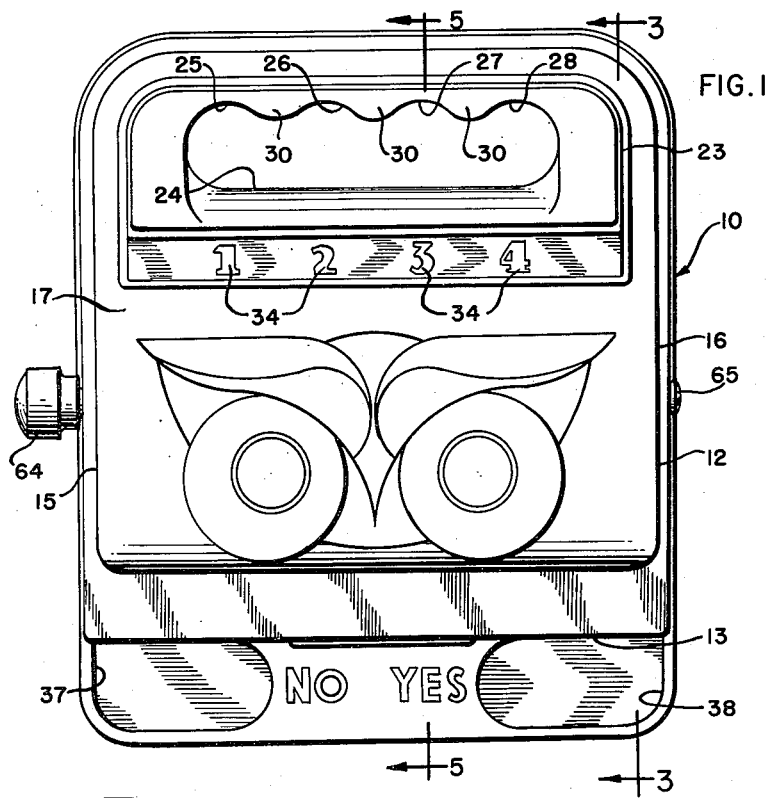
Figure 2:
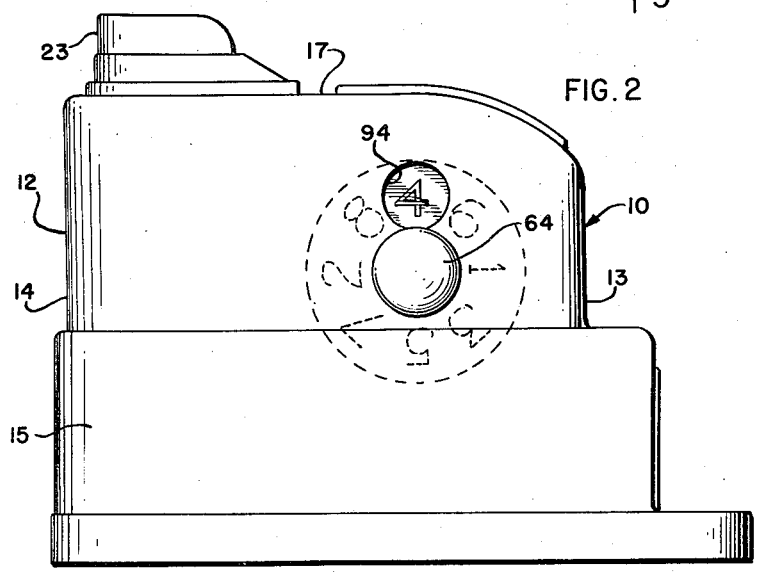

Considered generally, the exemplary embodiment of my quiz game apparatus which is disclosed in the accompanying drawings for illustrative purposes is enclosed within a housing 10 of a type such that the internal working parts, and particularly their positions at any period of operation are not visible to the user of the apparatus. In one of its preferred adaptations, the disclosed apparatus may be utilized with a set of cards arranged in predetermined sequence, and each of which cards presents a question to be answered, as well as a predetermined number of answers, among which one is correct. The disclosed apparatus presents a number of selective positions corresponding in number to the given answers and open to choice for the selection of a particular answer by the use of a free-playing element. Upon making a selection by the use of the free-playing element, the disclosed apparatus functions through its internal structure and relationship of parts to provide a positive indication of the accuracy or correctness of the selected answer.

Although any number of suggested answers may be provided for each question, I have chosen four as a reasonable number in this apparatus.

The embodied principles and structure would be substantially the same for the apparatus if the number of answer choices were different.

As depicted in the drawings, my preferred housing 10 is desirably composed of an upper part 12 which is integrally formed, as by molding of an opaque thermoplastic material, phenol fiber, or the like. The upper part 12 of the housing includes among its integral parts a front wall 13 of irregular contour, a rear wall 14, side walls 15 and 16; and a top wall 17. At the bottom, the housing is closed by a bottom wall 18 consisting of a sheet of plastic material or the like preferably adapted removably to be secured in place by fastening means, such as screws 19, threaded into bosses 20 which are integrally formed on the side and rear walls near the bottoms thereof.

Figure 7:
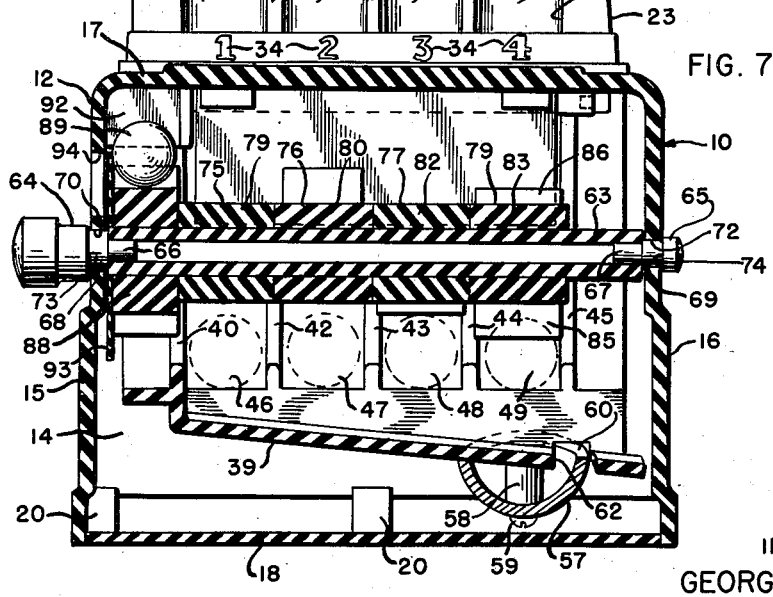
Fig. 7 is a front sectional view with the section taken substantially as indicated by the lines 7—7 in Fig. 3 and the accompanying arrows.

At the top and near the rear, an opening 22 of generally rectangular contour is provided. In that top opening is secured, as by cementing, an integrally molded fitting 23 which projects upwardly from the top wall 17 and has therein an elongated slot 24 of irregular contour and shaped to flare outwardly somewhat at the top to present four spaced positions 25, 26, 27 and 28 of a size sufficient readily and easily to receive and pass a free-playing device 29 which, in the present instance, comprises a ball. Between the spaced positions 25, 26, 27 and 28 the width of the slot 24 is restricted by integral and inwardly projecting lobes 30 to prevent the passage of the free-playing device. To facilitate the mounting of the fitting 23, it has an integrally formed shoulder 32 extending around the outside of the walls thereof, which shoulder rests against and is adapted to be cemented to the outer surface of the top wall 17. By preference, the fitting 23 has a portion 33 extending into the interior of the housing. Thus, the walls of the fitting are of sufficient depth to serve as an initial guide for the free-playing device. Also, and as indicated in Figs. 1 and 7, the respective spaced positions 25, 26, 27 and 28 for the insertion of the free-playing device are identified by indicia such as numerals 34 at a readily visible position at the exterior thereof.

Figure 6:
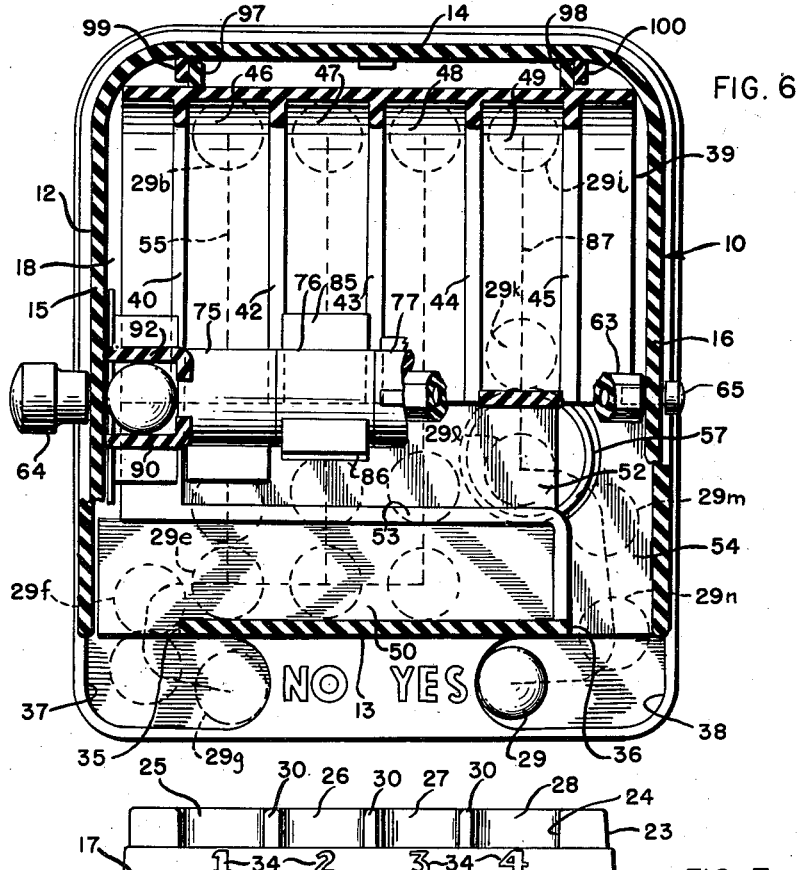
Fig. 6 is a top sectional view wherein the section is taken substantially as depicted by the lines 6—6 and the accompanying arrows in Fig. 5.

In the front wall 13 considerably below the level of the opening 22 and displaced from each other laterally of the housing are two outlet openings 35 and 36, as shown in Figs. 3 and 6. These two outlet openings provide alternative positions from which, in the disclosed apparatus, the free-playing device emerges from the housing after being placed therein at a selected position to provide a visual indication of the accuracy or correctness of the selected position of insertion. As shown in Figs. 1, 3 and 6, pockets 37 and 38 formed in the housing adjacent the exterior of the outlet openings 35 and 36, respectively, are preferably provided to receive and retain the free-playing device in an exposed and readily accessible position for re-use.

Within the housing 10, the path of travel of the free-playing device is controlled by a system of chutes extending downwardly from each of the spaced positions 25, 26, 27 and 28, from which the free-playing device is inserted, and terminating at one or the other of the pockets 37 or 38. I provide these chutes in my preferred structure by the use of an integrally formed insert 39 adapted bodily and unitarily to be inserted into the upper part 12 of the housing when the bottom wall 18 is removed. By preference, the general contour of the portion of the insert 39, which is near the spaced positions 25, 26, 27 and 28 for insertion of the free-playing device, is substantially arcuate, curving downwardly and toward the front wall of the housing. Integrally formed and substantially parallel ribs 40, 42, 43, 44 and 45 on the upper surface of the insert 39, as shown in Figs. 3, 5, 6 and 7, define channel-like guide chutes 46, 47, 48 and 49 adjacent one another and extending downwardly in aligned relationship to each of the spaced positions 25, 26, 27 and 28, respectively, for insertion of the free-playing device. The guide chutes 46, 47, 48 and 49 are of substantially equal length and terminate well within the housing 10 at positions spaced from the front wall 13 and with the terminal end portions thereof substantially horizontal, so that a free-playing device, such as the ball 29, having weight and passing freely down one of the guide chutes by the action of gravitational force, gains kinetic energy by which it is projected from the end of the guide chute.

In addition to terminating at positions spaced inwardly from the front wall 13 of the housing, the guide chutes 46, 47, 48 and 49 also terminate at positions spaced upwardly from the bottom wall 18 of the housing so as to be well above the outlet openings 35 and 36 and the pockets 37 and 38. In the space between the lower ends of the guide chutes 46, 47, 48 and 49 and the front wall 13 of the housing, the insert 39 is formed to provide reversely sloped outlet chutes 50 and 52 extending laterally across the interior of the housing in side-by-side relationship. The outlet chutes 50 and 52 are separated by an intermediate partitioning wall 53 which is spaced from and somewhat below the level of the lower ends of the guide chutes. Also, the outlet chutes 50 and 52 are below the level of the lower ends of the guide chutes; the chute 52 being adjacent the lower end of those guide chutes and the outlet chute 50 being spaced from the ends of the guide chutes by substantially the width of the outlet chute 52 and generally below the level of the outlet chute 52. Thus, the respective general levels of the outlet chutes 52 and 50 digress with their respective displacements from the ends of the guide chutes. Additionally, one of the outlet chutes is sloped laterally toward one of the outlet openings while the other is sloped laterally toward the other of the outlet openings. In the present instance, the outlet chute 52 slopes toward a plane surface 54 leading outwardly to the outlet opening 36 and pocket 38 around one end of the outlet chute 50. The outlet chute 50, which is desirably adjacent the front wall 13 of the housing, slopes somewhat toward that front wall and toward the outlet opening 35 and pocket 37.

From the description of the structure thus far presented, it may be readily understood that the kinetic energy gained by a free-playing element of predetermined weight when dropped into one of the selective positions, will reach a substantially predetermined amount when the passage of the free-playing device along the guide chute is unimpeded. The disclosed apparatus is so designed that with a free-playing device of predetermined weight, such as a steel bearing ball, the unimpeded passage of the ball down one of the guide chutes will effect its projection from the end of that guide chute across the outlet chute 52 and into the outlet chute 50. The path of the free-playing device in such an instance is depicted in Fig. 5 by a dotted line 55, with various progressive positions of the free-playing device being indicated in dotted lines at 29a, 29b, 29c, 29d, 29e, 29f and 29g. In order to guide the free-playing device and prevent it from bouncing unduly, I prefer to provide an angularly disposed baffle 56 which is secured to the interior of the front wall 13 at a position above the outlet chute 50, as shown in Figs. 4 and 5.

In the disclosed embodiment of my invention and in order to provide an audible signal designating the passage of the free-playing device along the chute 52, I have provided a bell 57 secured to the insert 39 and disposed in a position such that the free-playing device strikes the edge of the bell during its passage along the chute 52. As shown in Fig. 7, the bell 57 is secured to an integral boss 58. On the lower surface of the insert 39, by fastening means such as a screw 59, an edge 60 of the bell projects and is exposed through a slot 62 in the chute 52, so that as the free-playing device rolls down the outlet chute 52, it engages the edge 60 of the bell, thereby to provide an audible signal.

Since the free-playing device is projected from one of the guide chutes into the outlet chute 50 whenever its movement down the guide chute is unimpeded, it follows that a predetermined restriction or impedance to the movement of the free-playing device along a guide chute will reduce its kinetic energy and cause it to fall into the outlet chute 52, rather than jumping across that chute and into the outlet chute 50. In the disclosed apparatus, I have not only used this principle for obtaining the desirel selectivity which renders a physical and visual indication, but I also utilize the energy absorbed from the reduction of the kinetic energy of the free-playing device to effect variations in the position at which a correct selection is made. Thus, the use of the free-playing device in making the desired selections provides the operating power for the apparatus and makes it practically automatic for following a predetermined and pre-arranged series of questions or the like.

As illustrated in Figs. 6 and 7, a shaft 63 extends laterally across the interior of the upper part 12 of the housing with its axis disposed above and near the lower ends of the guide chutes 46, 47, 48 and 49. It is by preference that the axis of the shaft 63 is practically above and substantially parallel to the lower end edges of the guide chutes. I further prefer to utilize a shaft which is axially hollow and which has a polygonal outer sectional shape. At its ends, the shaft 63 is supported by doweled knobs or buttons 64 and 65 having integral portions 66 and 67, respectively, extending into and secured to the shaft. Integral bearing portions 68 and 69 of the knobs 64 and 65, respectively, are carried for rotation in bearing openings 70 and 72 in the side walls 15 and 16, respectively, of the housing. Shoulders 73 and 74 adjacent the bearing portions 68 and 69 of the buttons serve axially to locate the shaft by engagement with the outer surfaces of the housing side walls.

Mounted within the housing at axially spaced positions along the shaft 63, which positions are in substantially longitudinal alignment with the guide chutes 46, 47, 48 and 49, are a number of vane-carrying elements 75, 76, 77 and 78. These vane-carrying elements preferably have collar portions 79, 80, 82 and 83, respectively, of a length such that they serve as locating spacers for the ring-carrying element. Axially through the collar portions, polygonal openings, such as 84 (Fig. 4), fit onto the shaft to provide a driving connection between the shaft and the respective vane-supporting elements, so that all of the vane-supporting elements rotate with the shaft and movement of any one of the vane-supporting elements moves the shaft and the others. At angularly disposed positions, the vane-supporting elements have vanes 85 and 86 projecting radially therefrom. The radial length of the vanes is such that when and only when a vane is in a position such that it is disposed in substantially perpendicular relationship to the end surface of the adjacent and longitudinally aligned guide chute, that vane will obstruct the passage of the free-playing element along that guide chute, as depicted in Fig. 3. When any of the vanes are in any of their other normal positions, the free-playing element will pass freely and without obstruction along the guide chutes.

In order to simplify production and to reduce tool costs, the vane-carrying elements 75, 76, 77 and 78 are similar in structure. In order to vary the positions of the vanes so that only one guide chute is obstructed at any one time, the similar vane-carrying elements are disposed with their vanes projecting in different radial directions from the shaft.

In the exemplary structure which embodies four guide chutes and has four possible selections for choice, a variable sequence could be provided with four vanes if the shaft turned a quarter of a turn and the vanes were disposed with ninety degrees separation. However, a four number sequence could be readily memorized without conscious effort so that the value of the device would be depreciated by providing a subconscious or conscious clue to the correct answer. To avoid this, and to increase the variations in a sequence cycle, I have utilized two vanes on each vane-carrying element. It may be observed that the preferred number of sides of the polygonal shaft section is a multiple of the number of selective positions. Also, the number of vanes on each vane-carrying element is equal to the aforementioned multiple. Specifically, and for example, the disclosed shaft has an eight-sided section and is utilized with the four selective chutes with two vanes on each vane-carrying element. To provide an eight number sequence cycle by judicially and irregularly varying the positions of the vane-carrying elements, the confusion of number sequence in each cycle is sufficient to avoid easy or subconscious memorizing of the numbers of the sequence cycle.

With the specific and exemplary structure disclosed, the selection of an obstructed chute by placement of the free-playing element in the position to designate a correct answer causes the movement of the free-playing element to be impeded by contact with one of the vanes as depicted in Fig. 3. In this instance, the kinetic energy of the free-playing element effects movement of the vane and rotation of the shaft and other vanes to vary the position of the vanes during passage of the free-playing element. The kinetic energy thus absorbed in the movement of the vane-carrying structure sufficiently depletes the kinetic energy of the moving free-playing element to cause it to fall into the outlet chute 52. The course of the free-playing element in such an instance is indicated by a dotted line 87 in Figs. 3 and 6 and by sequential positions 29h, 29i, 29j, 29k, 29l, 29m, 29n and 29.

In order to effect stoppage of the vane movements at the proper vane positions in each instance, a substantially star-shaped retaining element 88 is mounted on one end of the shaft and drivingly connected thereto with the notches between the points of the peripheral star-shaped surface aligned with the various angular positions of the projecting vanes on the shaft. To provide an effective and rugged releasable retaining element for coaction with the star-shaped retaining element 88, I have provided a weighted ball 89 movable linearly with retaining channel walls 90 and 92 and disposed above the star-shaped retaining element 88 so that the normal gravitational force on the ball biases the retaining element to positions in which the ball rests in the successive notches thereof.

In order to provide an additional and effective variation for the sequence cycles, as well as to provide a visual indication of the proper starting position for a prearranged series of questions without disclosing the positions of the vanes within the housing, I have provided an indicating disc 93 on the end of the shaft 63 and secured thereto, which disc carries an irregular series of position-indicating indicia visible through an aperture 94 in the side wall 15 of the housing. The shaft and the vanes may thus be turned to any predetermined starting position for a pre-arranged set of questions by manual rotation of the knob 64; that starting position being then designated by an identifying mark visible through the aperture 94.

In order to prevent the positions of the vanes from being detected by looking through the slot 24 at any time, a partition wall 95 desirably projects downwardly from the interior of the molded fitting 23. In my disclosed structure, and as shown in Fig. 3, the partition wall 95 is braced by a cross piece 96.

From the foregoing description and reference to the accompanying drawings, it may be readily appreciated that I have provided quiz game apparatus adapted to low manufacturing and assembly costs as well as to long and trouble-free service in use. With the parts molded of a plastic material, they may be secured together to a large extent by the application of a suitable cement at the joints during assembly. Furthermore, the vane and shaft structure are susceptible to consistent and easy assembly as a separate subassembly, as well as to easy placement and assembly in the housing prior to insertion of the insert 39. The insert 39, carrying the bell 57, is then readily insertable into the housing before placement and securing of the bottom wall 18. In order to insure proper lateral location of the insert 39 within the housing part 12, integral ribs 97 and 98 are provided on the exterior of the fitting for engagement between integral ribs 99 and 100 on the interior of the rear wall 14 of the housing.

It may be further and readily appreciated that the disclosed quiz game apparatus is adapted to serve effectively as an indicator of the answers to various pre-arranged and pre-selected sets of questions. It avoids the temptation to look at the correct answer before making a selection by requiring a selection before the accuracy thereof can be ascertained. It also provides dependable indications of the accuracy of the answers and necessitates no mechanical skill or manipulation in its use, other than the preliminary setting to a starting position and the placement of the free-playing element for designating selections.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In quiz game apparatus, the combination comprising a number of inclined ball-receiving chutes presenting alternative choices for selection, a weighted element of a shape and construction such that it will move down a selected chute by gravitational force when placed on said chute to designate a selection, rotatably supported means including a polygonal shaft, the number of sides of said polygonal shaft being equal to a multiple of the number of chutes, vane elements having central openings of a size and shape to fit onto said polygonal shaft and each having a number of radially projecting vanes thereon equal to said multiple, and said vane elements being mounted on said shaft for rotational movement therewith and in varying positions such that one vane at a time is disposed in a position substantially aligned with and transverse to an adjacent portion of one of the chutes, said one of the vanes being in a position to intercept and be moved by said weighted element.

2. In quiz game apparatus adapted to the selection of alternative choices by the placement of a weighted element at one of a plurality of positions, the combination comprising a number of guide chutes equal to the number of alternative choices presented, said guide chutes being constructed and arranged for the movement of the weighted element therealong, at substantially predetermined and normally varying rates from one of the chute ends to the other end thereof, a plurality of outlet chutes disposed transversely of and at different distances from the ends of the guide chutes for receiving the weighted element from said other ends of the guide chutes, a plurality of movably supported vanes mounted adjacent and in positions of longitudinal alignment with the guide chutes, said vanes being relatively disposed and interconnected so that one of the vanes at a time obstructs one of the guide chutes at a position to deflect the normal travel of the weighted element, one of said outlet chutes receiving the weighted element when it is undeflected by a vane, and the other of the outlet chutes receiving the weighted element when it is deflected by engagement with a vane, and said vanes being movable by the force of the weighted element to vary the positions of the vanes so as to change the guide chute which is obstructed.

3. In quiz game apparatus, the combination comprising a housing having therein a plurality of upper openings at elevated positions and two outlet openings disposed in spaced relationship to one another at a level below the upper openings, an inclined guide chute extending downwardly and in the general direction of the outlet openings from each of the upper openings, sloped outlet chutes disposed in side-by-side relationship and substantially at right angles to the lower ends of the guide chutes and each extending to one of said outlet openings, said outlet chutes being below the levels of the lower ends of the guide chutes and at different distances from the lower ends of the guide chutes, a ball of a size to be dropped into a selected one of the top openings and to roll down the associated guide chute, the weight of said ball and the slopes of said chutes being so related to the spacing of the outlet chutes from the ends of the guide chutes that the ball will normally jump across the outlet chute that is nearer the ends of the guide chutes and into the other outlet chute when the movement of said ball down a guide chute is unrestricted, and means hidden from view from outside the housing for restricting movement of the ball down predetermined and sequentially varying ones of the guide chutes to an extent that the ball will fall into the outlet chute which is nearer the ends of the guide chutes.

4. Quiz game apparatus comprising, in combination, a housing having therein a plurality of separate top openings and two outlet openings displaced from and at a level below the top openings, an inclined guide chute extending downwardly from each of the top openings, sloped outlet chutes disposed in side-by-side relationship at the lower ends of the guide chutes and each extending to one of said outlet openings, means movably supporting a series of vanes in positions such that each is aligned longitudinally with one of the guide chutes, said vanes normally having positions such that one of the vanes at a time provides an obstruction for one of the guide chutes, means providing actuating connections between said vanes for sequentially moving them into obstructing positions relative to the chutes, a weight element of a size to be dropped into a selected one of the top openings and to pass down the associated guide chute to one of the outlet chutes, the obstructions of said guide chutes by said vanes serving to determine which of the outlet chutes the weight element will pass to from the selected one of the guide chutes, the weight and movement of said weight element in a guide chute obstructed by a vane providing actuating force by engagement with the chute obstructing vane for effecting predetermined movements of all the vanes.

5. Quiz game apparatus as defined in claim 4, and further characterized by a manually movable element having an indicating device connected thereto and connected to said vane-supporting means for manually varying the positions of said vanes.

GEORGE W. EMMERT.

REFERENCES CITED

The following references are of record in the file of this patent:

UNITED STATES PATENTS

| Number | Name | Date |
|---|---|---|
| 2,062,453 | Hastings | Dec. 1, 1936 |
| 2,311,217 | Emmert | Feb. 16, 1943 |